(12) United States Patent
Gandy

(10) Patent No.: US 6,222,852 B1
(45) Date of Patent: Apr. 24, 2001

(54) METHOD AND APPARATUS FOR TRANSMITTING DUAL SPEED ETHERNET INFORMATION (10BASE-T AND 100BASE-TX) ACROSS A PHYSICAL LAYER DEVICE SERVICE INTERFACE

(75) Inventor: Thomas W. Gandy, Palo Alto, CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/541,823

(22) Filed: Apr. 3, 2000

Related U.S. Application Data

(63) Continuation of application No. 08/979,020, filed on Nov. 26, 1997, now abandoned, which is a continuation-in-part of application No. 08/949,077, filed on Oct. 10, 1997, now Pat. No. 6,141,352.

(51) Int. Cl.[7] .............................. H04L 12/66; H03M 7/34; H03M 7/00; H04J 3/16
(52) U.S. Cl. ............................. 370/463; 370/465; 341/51; 341/110
(58) Field of Search ..................................... 370/463, 465, 370/438, 501; 375/361; 341/110, 70, 51, 69, 173, 60; 709/250

(56) References Cited

U.S. PATENT DOCUMENTS

| | | | |
|---|---|---|---|
| 5,577,069 | 11/1996 | Lau et al. ........................... | 375/242 |
| 5,754,540 | 5/1998 | Liu et al. ........................... | 370/315 |
| 5,852,609 | 12/1998 | Adams, III et al. ................. | 370/465 |
| 5,896,417 | 4/1999 | Lau ..................................... | 375/258 |
| 5,907,553 | 5/1999 | Kelly et al. ......................... | 370/433 |
| 5,923,663 | 7/1999 | Bontemps et al. .................. | 370/445 |
| 6,069,897 | * 5/2000 | Perlman et al. ..................... | 370/420 |
| 6,094,439 | * 7/2000 | Krishna et al. ..................... | 370/445 |

OTHER PUBLICATIONS

Advanced Micro Devices, Am79865/Am79866A: Physical Data Transmitter/Physical Data Receiver. Publication # 15451, Revision D, 18 pages, Jun. 1996.

\* cited by examiner

*Primary Examiner*—Alpus H. Hsu
*Assistant Examiner*—Duc Ho
(74) *Attorney, Agent, or Firm*—Blakely Sokoloff Taylor & Zafman LLP

(57) ABSTRACT

A method and apparatus for transmitting information compatible with IEEE 802.3, 10BASE-T, 100BASE-TX, and Ethernet LAN standards across a service interface in the Physical Layer which is architected to reduce pin count in multi-port Physical Layer Devices. The service interface architecture allows specification of a four channel PHY device in a PLCC package or a six channel PHY device in a PLCC package and reduces the interface connection requirement of a twelve channel MAC device to 56 pins from a worst case 216 pins for 802.3 standard MII implementations. The interface utilizes a single, constant rate system clock and a single transmission path per channel that operates at constant speed while supporting both 10 Mb/s and 100 Mb/s data rates. The service interface separates the digital gates, in the Physical Layer from the analog functionality to implement a dual speed, 10/100 Mb/s IEEE standards compliant PHY device, with Auto-Negotiation, that optimizes device implementation technology to functional requirements, but does not necessarily adhere to the architectural boundaries and signaling primitives defined in the IEEE 802.3 standard.

27 Claims, 5 Drawing Sheets

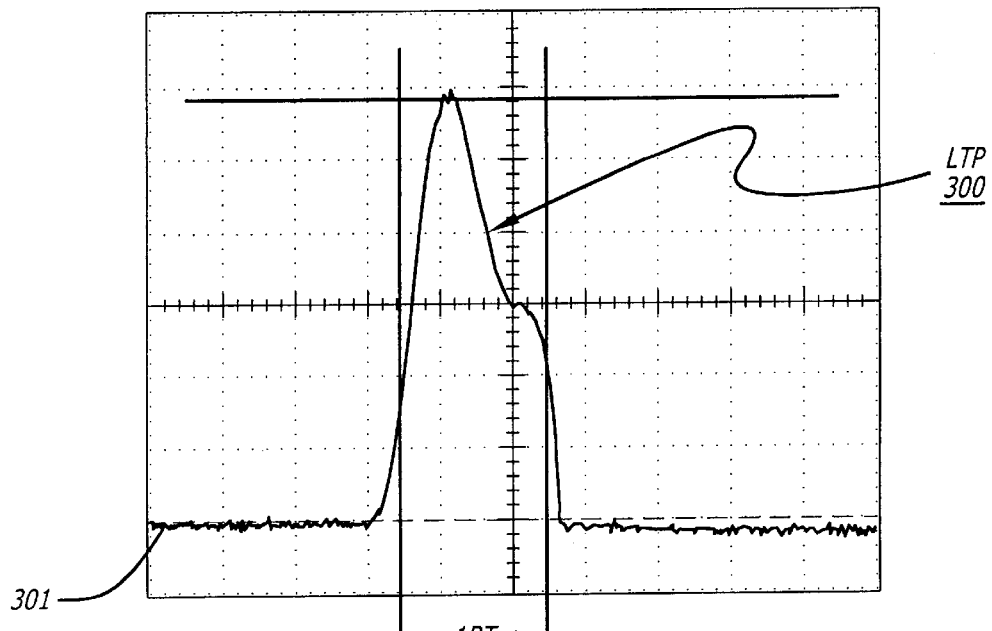
FIG. 3A *(Prior Art)*
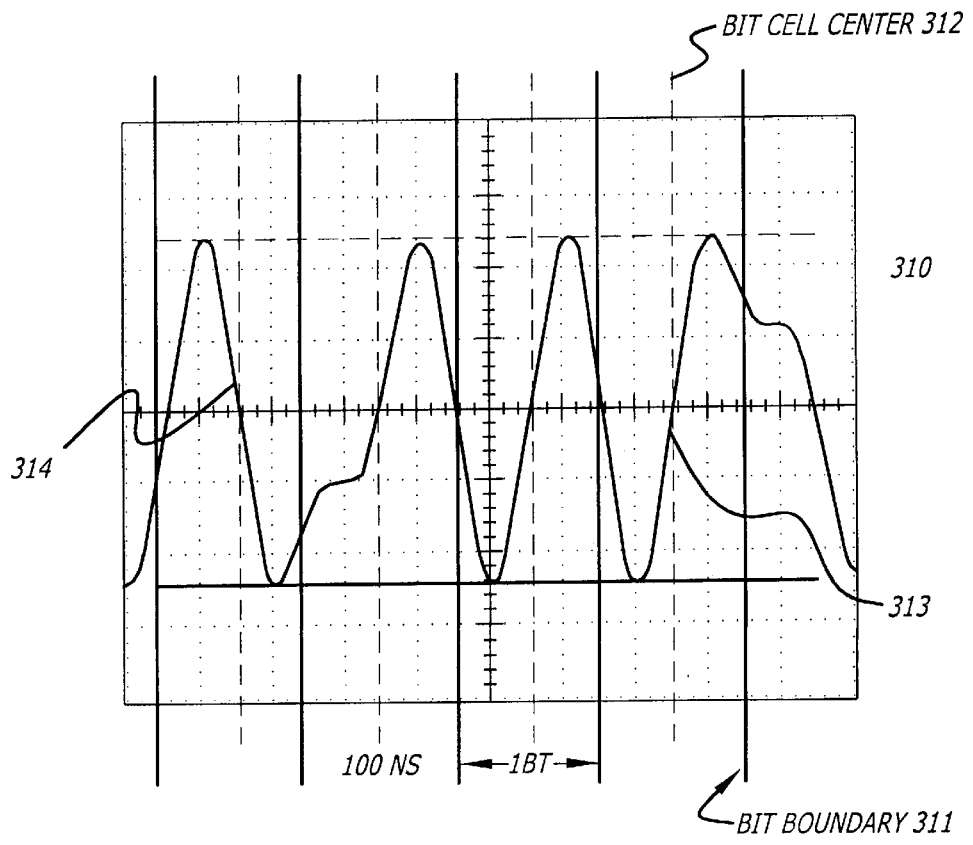
FIG. 3B *(Prior Art)*

METHOD AND APPARATUS FOR TRANSMITTING DUAL SPEED ETHERNET INFORMATION (10BASE-T AND 100BASE-TX) ACROSS A PHYSICAL LAYER DEVICE SERVICE INTERFACE

CROSS REFERENCE TO RELATED APPLICATIONS

This is a continuation of application Ser. No. 08/979,020 entitled "METHOD AND APPARATUS FOR TRANSMITTING DUAL SPEED ETHERNET INFORMATION (10BASE-T AND 100BASE-TX) ACROSS A PHYSICAL LAYER DEVICE SERVICE INTERFACE" filed Nov. 26, 1997, which is now abandoned, which is a CIP of Ser. No. 08/949,077 filed Oct. 10, 1997, which is now U.S. Pat. No. 6,141,352.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of baseband computer networks. Specifically, the present invention relates to a method and apparatus utilized by a dual speed 10/100 Mb/s physical layer device. The dual speed device provides support for transmitting waveshape information compatible with the Institute of Electrical and Electronic Engineers (IEEE) 802.3 Clause 14, 10 million bits per second (10 Mb/s) Physical Layer specification, i.e., IEEE 802.3 Standard 10BASE-T Ethernet, over a service interface in the physical layer.

Although not specified in IEEE 802.3, the interface can also be utilized in the implementation of 100 million bits per second (100 Mb/s) Local Area Network (LAN) physical layer devices compatible with the Physical Layer specifications defined in the IEEE 802.3u Supplement (excepting Clause 23 and 26), i.e., IEEE 802.3 Standard 100BASE-TX Ethernet.

2. Description of the Related Art

Overview of 10 MbAs and 100 Mb/s Baseband Networks

To better appreciate and understand the present invention, a brief overview of relevant aspects of 10 Mb/s and 100 Mb/s baseband local area networks follows. The operation of a Local Area Network (LAN) is often described in terms of the International Standards Organization (ISO) seven-layer Open Systems Interconnection (OSI) abstract reference model. Referring to FIG. 1, the relationship between the seven-layer OSI reference model 100 and the IEEE 802.3 architectural layers for 1 Mb/s to 20 Mb/s operation model 110 and 100 Mb/s operation model 115 are shown.

10BASE-T is an IEEE standard 802.3 and ISO/IEC standard 8802-3 Physical Layer specification for 10 Mb/s Ethernet LANs. 100BASE-T is an IEEE 802.3 standard supplement (802.3u) Physical Layer specification for 100 Mb/s Ethernet LANs. The 802.3u standard extends the speed of the 802.3 Media Access Controller (MAC) to 100 Mb/s while utilizing the existing MAC service interface 102 of MAC 120. MAC service interface 102 is connected through a Reconciliation sublayer 103 and a Media Independent Interface (MII) 130 to a Physical Layer Device (PHY) sublayer 104. The MII is the IEEE 802.3 standard specification for a dual speed 10/100 Mb/s service interface in the Physical Layer 10, although implementation of the MII is optional.

The PHY sublayer 104 may be specified for operation at data rates of either 10 Mb/s or 100 Mb/s. The specifics of a 10 Mb/s PHY sublayer connected to an MII are not explicitly defined by the 802.3 standard, but inferred to match the overall system performance objectives of the MAC 120, PLS 121, AUI 113, PMA 114, and MDI 111 architecture at 10 Mb/s.

Multiple PHY sublayers have been specified in IEEE standard supplement 802.3u (and later supplements) for operation at 100 Mb/s. The current list of 100 Mb/s PHY sublayer specifications includes 100BASE-T4, 100BASE-T2 and 100BASE-X.

100BASE-T4 specifies the use of four pairs of category 3, 4 or 5 Unshielded Twisted Pair (UTP) wire and supports only half duplex operation. 100BASE-T2 specifies the use of two pairs of category 3,4, or 5 UTP wire and supports full duplex operation. 100BASE-X supports two embodiments, both of which support full duplex operation: 100BASE-TX and 100BASE-FX. 100BASE-TX specifies the use of 2 pairs of category 5 UTP or shielded twisted pair (STP) wire. 100BASE-FX specifies the use of 2 optical fibers. Generally, the term 100BASE-X is used when referring to characteristics common to both 100BASE-TX and 100BASE-FX.

100BASE-X is an IEEE standard 802.3 Physical Layer specification for 100 Mb/s LANs that uses the FDDI signaling standards. 100BASE-X encompasses 100BASE-TX (which references ANSI X3T9.5 TP-PMD/312, Revision 2.2, FDDI Twisted Pair Physical Medium Dependent (PMD) sublayer), and 100BASE-FX (which references ISO 9314-3, 1990, Fiber Distributed Data Interface (FDDI)—Part 3: Token Ring PMD sublayer).

As described in clause 28 of IEEE standard 802.3u, Auto-Negotiation is an optional function that allows a network device, such as a workstation, switch or repeater, coupled to a point-to-point link segment, to advertise the modes of operation of which it is capable to a network device at the other end of the point-to-point link segment and detect corresponding operational modes that the other network device may be advertising. Auto-Negotiation provides the capability for future technology upgrades and can be modified to advertise such modes of operation as types of physical layer devices available, full -duplex communication, and flow control. Auto-Negotiation further provides, through the use of the Parallel Detect Algorithm, the ability to detect and interoperate with legacy, non-Auto-Negotiation, half duplex, 10BASE-T, 100BASE-TX and 100BASE-T4 based nodes where applicable. Auto-Negotiation is designed for LANs implemented using unshielded twisted pair (UTP) copper wire and the well known, ISO/IEC 8802, eight-pin modular jack (RJ-45 connector). The signaling mechanism used in Auto-Negotiation is backwards compatible with the installed base of 10BASE-T baseband computer networks as defined in IEEE 802.3 Clause 14.

10BASE-T operation employs a discontinuous signaling method over the transmission medium. When data is not being sent over the medium, the voltage on the medium is zero, with the exception of an occasional Link Test Pulse 300. The Link Test Pulse, as defined in IEEE standard 802.3 Clause 14, signals that an active link connection exists. The Link Test Pulse is generally a 100 nanosecond positive pulse that repeats approximately every 16 milliseconds. Clause 28

Auto-Negotiation refers to the 10BASE-T Link Test Pulse as the Normal Link Pulse (NLP). Auto-Negotiation uses multiple Link Test Pulses to form a burst referred to as a Fast Link Pulse (FLP) Burst, as a signaling mechanism. Auto-Negotiation substitutes the FLP Burst in place of the single 10BASE-T Link Test Pulse. This approach increases the signaling capability of the link identifier, while maintaining backwards compatibility with 10BASE-T. The FLP Burst encodes the data (identifying modes of operation) transmitted by the Auto-Negotiation function.

100BASE-T Architecture and Nomenclature

With reference to FIG. 1, the 100BASE-T standard extends the IEEE standard 802.3 Media Access Control (MAC) sublayer 120 to 100 Mb/s and couples the MAC sublayer to a 100 Mb/s Physical Layer 101. The Physical Layer is comprised of additional sublayers including the Reconciliation Sublayer 103, Media Independent Interface (MII) Sublayer 130, Physical Coding Sublayer (PCS) 140, Physical Medium Attachment (PMA) sublayer 150, Physical Medium Dependent (PMD) sublayer 160 and, in a 100BASE-T4, 100BASE-T2 or 100BASE-TX environment, an optional Auto-Negotiation (AutoNeg) sublayer 170. The PMD sublayer 160 encompasses the Medium Dependent Interface (MDI) 180. The MDI provides the medium attachment, including the connector, to the medium 190, such as UTP or STP wiring.

Reconciliation Sublayer

The Reconciliation Sublayer maintains the same interface 102 to the MAC layer 120 for 100 Mb/s operation as for 1 Mb/s to 20 Mb/s operation by reconciling the differences between the Physical Layer architectures described in IEEE 802.3 clauses 5 through 20 utilizing the PMA 114, AUI 113, and MAU 112 sublayers, and the MII based architecture described in 802.3u.

Media Independent Interface (MII)

The MII sublayer provides, among other things, an interconnection between the MAC sublayer and Physical Layer devices. As the name implies, this layer was designed to clearly separate the MAC sublayer from medium dependent issues. Although optional in implementation, the MII is the dual speed, Physical Layer service interface specified in the 802.3 architectural model. The MII is designed to support multiple Physical Layer (PHY) 104 devices operating at different speeds, e.g., 10 Mb/s or 100 Mb/s and providing support for different media or different line signaling strategies. The MII defines receive and transmit directions for data transfer, each comprised of a clock, error, enable and four data signals. Additionally, there is a Carrier Sense Line, a Collision Line, a Management Port, and a clock to allow communication of setup and status issues to and from the PHY device. The resulting interface requires a total of eighteen signals. The MII can be embodied, for example, in an integrated circuit to integrated circuit interface with traces on a single printed circuit board (PCB), a motherboard to daughterboard interface across at least two PCBs, or a cable with appropriate connectors coupling two PCBs.

PCS Sublayer (for 100BASE-TX PHY Devices)

With reference to FIG. 2, the PCS sublayer 230 provides a Media Independent Interface (MII) 220 to a Reconciliation sublayer 210 which, in turn, provides an interface between the MAC sublayer 200 and the Physical sublayers. The PCS sublayer transfers information with the MAC sublayer via asynchronous, nibble-wide (i.e., 4-bit wide) transmit and receive lines 221 and 222, respectively. The nibbles passed to the MAC sublayer are derived from code groups of 5 bits each (discussed below), which, in turn, are received from the medium via the PMA 240, PMD 250 and MDI 260. In a 100BASE-X environment, a PCS receive code bits process 239 accepts a continuous stream of 5-bit code groups at a rate of 25 million code groups per second (125 million bits per second). Each 5 bits that make up a code group is converted to a 4-bit value by a 4B5B decoder before being passed to the MAC sublayer 200 at a data rate of 25 million nibbles per second (100 million bits per second).

Likewise, a PCS transmit code bits process 238 transmits a continuous stream of code group bits generated by a 4B5B encoder based on bits received from the MAC sublayer via nibble-wide data line 221. Line 221 transmits data received from the MAC sublayer at a rate of 25 million nibbles per second, while transmit code bits process 238 transmits code group bits at a rate of 25 million code groups per second (125 million bits per second).

Code Groups (for 100BASE-X PHY Devices)

PCS 230 converts 4 bits received from RS 210 into 5-bit code groups via a 4B5B encoder. Likewise, a 4B5B decoder converts 5-bit code groups received from PMA 240 into 4-bit nibbles. The IEEE Standard 802.3u defines a code group as a consecutive sequence of five code bits that are interpreted and mapped by the PCS. Code groups are defined in ISO 9314-1 (Fibre Distributed Data Interface (FDDI) - PHY, Table 1. Therein, a 4B5B data coding format is described in which a 4-bit nibble is mapped into a five bit code group. The nibbles of data, which represent hexadecimal digital words, are aligned to a 25 MHz clock. The resulting data rate of 100 Mb/s is converted by 4B5B encoding into a code bit rate of 125 Mb/s. Implementers may choose a 100 Mb/s/125 Mb/s serial implementation of the 4B5B encoding process, or a 4-bit wide to 5-bit wide parallel implementation of the 4B5B encoding process clocked at 25

PCS Mapping of Data Between MII and PMA (for 100BASE-X PHY Devices)

When receiving data from the PMA sublayer, the PCS 230 maps a nonaligned code-bit data line 234 from the PMA 340 to an aligned, 4-bit wide data line 222 across the MII 220. On transmitting data to the PMA, the PCS 230 maps an aligned, nibble-wide data line 321 across the MII to a nonaligned code-bit data line 233 to the PMA. Data bits are buffered on both transmission from and reception at the PCS by the transmit code bits process 238 and receive code bits process 239, respectively.

Upon receipt of a nibble from the MII 220, a 4B5B encoder in transmit process 224 of PCS 230 encodes the nibble into a 5-bit code group, according to the ISO 9314-1 FDDI PHY standard. Each 5-bit code group is buffered and transmitted to the PMA 240 as a serial string of five data bits by transmit code bits process 238. Likewise, upon receipt of a serial string of code group bits from PMA 240 over line 234, the receive code bits process 239 of PCS 230 buffers and deserializes 5-bit code groups before passing the code groups to a 4B5B decoder in receive process 225. The 4B5B decoder converts the code groups into nibbles and passes the nibbles on to MII 220, again according to the ISO 9314-1 FDDI PHY standard.

Carrier Detection and Data Transmission (for 100BASE-X PHY devices)

PCS 230 sends 5-bit code groups to the PMA as described above. When not transmitting data packets, the PCS transmit code bits process 238 continually sources idle (I) code groups to the PMA. When the MII indicates to the PCS that data is ready to be transmitted, the transmit process 224 transmits a start of stream delimiter (SSD) (i.e., a J, K code group pair according to the above referenced FDDI PHY standard) to the PMA 240. Data received at the PCS sublayer from the MII 220 is then encoded into 5-bit code groups and transmitted to the PMA 240.

The receive code bits process 239 in the PCS sublayer receives code bits from the PMA 240. The receive bits are serially loaded into a 10-bit wide sliding window at a rate of 125 Mb/s. Most recently received code bits enter the sliding window at a location receive bit (RX BIT) 0 within the window. As each new bit is received, the existing bits in the window are shifted one position. When a code group of 5 bits is detected in the window, it is forwarded over line 232 to a 4B5B decoder in receive process 225, where the code group is converted to a nibble and passed to MII 220.

10BASE-T PHY Device—Architecture and Nomenclature

The timing performance or architectural layers for a 10 Mb/s PHY device connected to an MII are not explicitly defined by 802.3 but inferred to match the 10 Mb/s performance objectives of the 1 Mb/s through 20 Mb/s IEEE architectural model 110. IEEE 802.3 Clause 7 defines the physical layer specifications for the Physical Signaling (PLS) sublayer 121 and the Attachment Unit Interface (AUI) 113. IEEE 802.3 Clause 14 defines the physical layer specifications for the 10BASE-T Medium Attachment Unit (MAU) 112. The MAU sublayer consists of the Physical Medium Attachment (PMA) 114 and the Medium Dependent Interface (MDI) 112, which connects to the physical medium. The physical medium for 10BASE-T is two pairs of either Category 3, 4, or 5 unshielded twisted pair (UTP) wire.

The PLS, AUI, and MAU architectural sublayers in IEEE 802.3 Clauses 7 and 14 define the physical medium signaling to MAC sublayer engineering specifications which also apply to a 10BASE-T PHY sublayer utilizing a MII sublayer and a Reconciliation sublayer.

10BASE-T Physical Medium Signaling

10BASE-T operation employs a discontinuous signaling method over the transmission medium. As shown in FIG. 3A, when data is not being sent over the medium, the signal on the medium (at point 301) is zero volts, with the exception of an occasional Link Test Pulse (at 301). The Link Test Pulse is nominally a pulse of positive polarity for a duration of 100 ns which repeats every 16 ms to signal that an active link connection exists. When data is transmitted to the physical medium it is encoded using the well-known Manchester encoding technique. The data rate is 10 Mb/s, so it follows that the bit cell boundaries 311 are spaced at the inverse of the data rate, or 100 ns. This bit cell spacing is known as one Bit Time (BT). With reference to FIG. 3b, in Manchester encoding, a binary value of zero or one is represented by a transition in the center of a bit cell (at, e.g., 312). In particular, a "ONE" bit (at, e.g., 313) is represented by a positive signal transition in the center of the bit cell 312 and a "ZERO" bit (at, e.g., 314) is represented by a negative signal transition in the center of the bit cell 312.

Data sequences of all ONEs or all ZEROs have signal transitions at the bit cell boundary (e.g., at 311) as well as in the center of the cell (e.g., at 312). As a result, transitions may be expected to occur in increments of one half bit time (BT/2), that is, every 50 ns. However, from this information alone, it is impossible for a receiver to determine whether the signal transition occurred on a bit cell boundary or at the center of the bit cell. ONE/ZERO sequences only have signal transitions in the center of the bit cells. As a result, if two signal transitions in a data stream are spaced one bit time apart, both transitions must have occurred at the bit cell centers. This assumption is made by the receiver to define bit cell alignment. Thus, a data transmission starts with a period of valid Manchester encoding of a 1,0,1,0,1,0 bit sequence and so on to facilitate bit cell alignment. This start up alignment sequence is known in the art as a Preamble.

The start of data transmission is easily differentiated from a Link Test Pulse as a Link Test Pulse represents a single positive polarity pulse of one BT duration. If there is a third valid transition, the waveform received cannot be a Link Test Pulse, so the receiver treats the waveform as data. Receiver circuitry which changes the input sensing mechanisms (to better differentiate between unwanted noise events and valid data) upon receipt of a third signal transition is known as "Smart Squelch".

With respect to FIG. 3C, to signal the end of data transmission, a single pulse, Manchester Code violation of 2.5BT to 4.5BT duration is transmitted, known as the start of idle signal (TP_IDL) 320 which signals the start of idle. The TP_IDL signal always starts with the last positive signal transition in a data stream. If the last bit transmitted was a ONE, there is a last positive signal transition that naturally occurs in the center of the bit cell. If the last bit transmitted is a ZERO, the transition in the center of the bit cell is negative, as illustrated at 322 in FIG. 3C, and a last positive signal transition is therefore added following the trailing bit cell boundary (at 311) of the last bit transmitted. The idle signal at 323 represents a quiet line where allowable noise events are required to be less than ±50 mv (after filtering by e.g., a 15 MHz, third order Butterworth input noise filter).

As a result of the Manchester encoding, the only valid data waveforms that appear on the physical medium occur at a rate 5 MHz and 10 MHz. 10BASE-T is designed to operate over a maximum of 100 meters of Category 3 wire, which has significantly more signal attenuation at 10 MHz than at 5 MHz. To compensate for this difference in frequency loss, the trailing edge of the 5 MHz waveform is altered to reduce the power level in such a way that the 5 MHz waveforms and the 10 MHz waveforms are of nearly equal voltage level at the far end of 100 meters of wire. This altering of the trailing edge of the 5 MHz waveform is known a pre-distortion.

It can be appreciated from the above discussion that all allowable physical medium signals can be represented by large positive or negative signal transitions (to create waveforms) or small positive or negative signal transitions (to shape the waveforms to create pre-distortion). All major signal transitions must occur in time increments of BT/2 (50 ns) and waveform pre-distortion can be created through the use of small signal transitions on the same time boundaries.

Given the extremely limited number of voltage signal transition forms (waveshapes) and timing relationships of the waveshapes found in 10BASE-T physical medium signaling, what is needed is a method and apparatus for efficiently transmitting 10BASE-T and 100BASE-TX information over the same physical layer device service interface.

IEEE Architectural Model Versus Implementation

IEEE 802.3 Physical Layer specifications provide an architectural model upon which to implement an interface device that couples a MAC layer interface to a physical medium operating at 1 Mb/s through 20 Mb/s or 100 Mb/s.

As discussed above, the architectural model focuses on a logical and functional division of services provided by each layer in the model and communication between the various layers comprising the functions. However, the actual implementation of a device (i.e., the electrical and mechanical components and their interconnection between the physical medium and MAC) in accordance with the IEEE 802.3 standard may substantially depart from the logical and functional divisions defined by the architectural model. It is understood by those skilled in the art that so long as the actual implementation adheres to the exact 802.3 specifications for physical medium signals appearing at the Medium Dependent Interface (MDI) for 100 MB/s and 10 MB/s operation, the implementation need not exactly follow the logical and functional divisions defined in the architectural model. What is desired is an implementation of a service interface for a physical layer device that provides efficient and economical configuration of integrated circuits and the like based on considerations of technology rather than considerations of logical functions, so long as the implementation adheres to the exact specification of the physical medium signals and medium access operations set forth in the applicable medium to MAC/LLC specifications.

Although optional in implementation, the Medium Independent Interface (MII) is the dual speed physical layer device service interface specified in the 802.3 architectural model. The MII specifications were drafted as part of supplement 802.3u for 100 Mb/s operation. MII operation at 10 Mb/s was not fully specified or diligently reviewed by the IEEE, resulting in violations in the 802.3 Clause 14, 10BASE-T signaling specifications, reduction in allowable network size due to increased delays and uncertainties (Clause 13 guidelines), and the impossibility of implementing a 10BASE-T port with system performance competitive with that in the legacy, 802.3 Clause 7/Clause 14, PLS/AUI/MAU architecture. What is needed is an alternative to the MII that is capable of operating at 10 Mb/s and 100 Mb/s rates and allows implementation of LAN systems that can perform at the maximum levels allowed by the applicable IEEE standard.

All commercial implementations of physical layer devices adhering to the IEEE 802.3 standards utilize both analog circuit functions and digital circuit functions. These functions may be combined in a single device or split among multiple devices. If analog and digital functions are combined in a single device, mixed signal design methodologies are required in the engineering process. The establishment of engineering competency in mixed signal techniques is significantly more complex, expensive and risky than that for design of Application Specific Integrated Circuits (ASICs) limited to digital circuit cells in an "off the shelf" core. In the generic digital ASIC approach, standard cells, already placed in silicon, are connected together using custom metal layers to form the custom integrated circuit. What is desired is the option to utilize this design methodology at the most established and stable level of design environment, then focus on the digital design complexities of MAC/LLC system ASICs, having hundreds of thousands of gates, as required by modem commercial implementations.

IEEE 802.3 Clause 28 AutoNegotiation requires approximately 5000 digital gates in the Physical Layer for implementation. The digital portions of a 10BASE-T PHY requires approximately 1500 digital gates for implementation of physical medium to MAC layer functionality. The digital portions of a 100BASE-TX PHY requires approximately 10,000 digital gates for implementation of physical medium to MAC layer functionality. What is desired is a service interface that allows the large quantity of digital gates required in the Physical Layer for a dual speed PHY with Auto-Negotiation to be included as part of the large, digital ASICs, having on the order of hundreds of thousands of gates, common to commercial LAN product implementations.

Technological advances in analog circuitry presently do not keep pace with the significant technological advances in Complementary Metal Oxide Semiconductor (CMOS) Integrated Circuit (IC) technology. Advances in digital circuitry continue to produce smaller gates and die sizes, increase functionality and reduce costs. What is needed then, is a Physical layer device whose implementation separates the digital integrated circuitry from the analog circuitry to take advantage of the improvements in digital ICs without affecting stable, analog circuitry.

Further, what is needed is an implementation of a physical layer device conforming to the IEEE 802.3 standards that provides switchable 10BASE-T signaling or 100BASE-TX signaling and provides support for Auto-Negotiation and dual speed media access controller devices, e.g., a 10/100 Mb/s MAC device.

The commercial desire for lower cost products drives the effort towards higher levels of integration and components that can process multiple Ethernet connections (ports) in a single device. As the number of ports supported by a device increase, the number of electrical connections (pins) required to implement the device increases. An increase in pin count requires increased package size or the use of pins that are smaller in size and closer together. Both of these trends tend to increase package cost, and reduce robustness for both electrical performance and manufacturing processes. What is needed then, is a service interface which minimizes the number of electrical connections required to implement a multi-port, Physical Layer Device.

10BASE-T is the overwhelmingly dominant LAN signaling format in use in the installed base of LANs. 100BASE-TX is the dominant high speed LAN signaling format. Emerging LAN requirements such as video conferencing, telephony and multimedia are encouraging development of alternate network formats such as asynchronous transfer mode (ATM). Large scale commercial acceptance of new network formats will demand either a level of backwards compatibility or at least the ability to revert to the dominant LAN formats previously mentioned. It is desirable for any new LAN format to use the same waveshapes and data cells on the media as 10BASE-T and/or 100BASE-TX, but use such in new and different ways. What is needed then is a service interface in the Physical Layer which separates the functionality of transmission and recovery of physical medium signals from the functionality of coding and decoding the information carried by the signals. In this way, new LAN formats can be investigated and deployed without changing stable analog circuitry or PHY device implementations.

BRIEF SUMMARY OF THE INVENTION

An embodiment of the present invention provides a method and apparatus for transmitting information compatible with IEEE 802.3, 10BASE-T, 100BASE-TX Auto-Negotiation, and Ethernet LAN standards across a service interface located in the Physical Layer of the International Standards Organization (ISO) reference model for Open Systems Interconnection (OSI).

One embodiment of the present invention provides an implementation of a Physical Layer Device (PHY) that provides optimum configuration of integrated circuits and the like based on technology considerations rather than the logical functions defined by the architectural model set forth in the IEEE 802.3 standard and supplements.

Another embodiment of the present invention may minimize the number of electrical connections required to implement a PHY device that supports a number of Ethernet LAN connections. As an example, an embodiment of the present invention allows specification of a Quad PHY device in a PLCC package or a Hex PHY device in a PLCC package and reduces the interface connection requirement of a twelve channel MAC device to 56 pins as opposed to a worst case 216 pins for an 802.3 standard MII implementation.

Yet another object of the present invention may provide a method and apparatus to separate the functionality of transmission and recovery of physical medium signals from the functionality of coding and decoding the information, which facilitates the investigation and deployment of new LAN formats without requirement of change to Ethernet LAN PHY device implementations.

BRIEF DESCRIPTION OF THE SEVERAL VIEWS OF THE DRAWINGS

The present invention is illustrated by way of example and not limitation in the following figures. Like references indicate similar elements, in which:

FIG. 3A illustrates a Link Test Pulse signal.

FIG. 3B illustrates Manchester encoded signals.

DETAILED DESCRIPTION OF THE INVENTION

Figure 1:
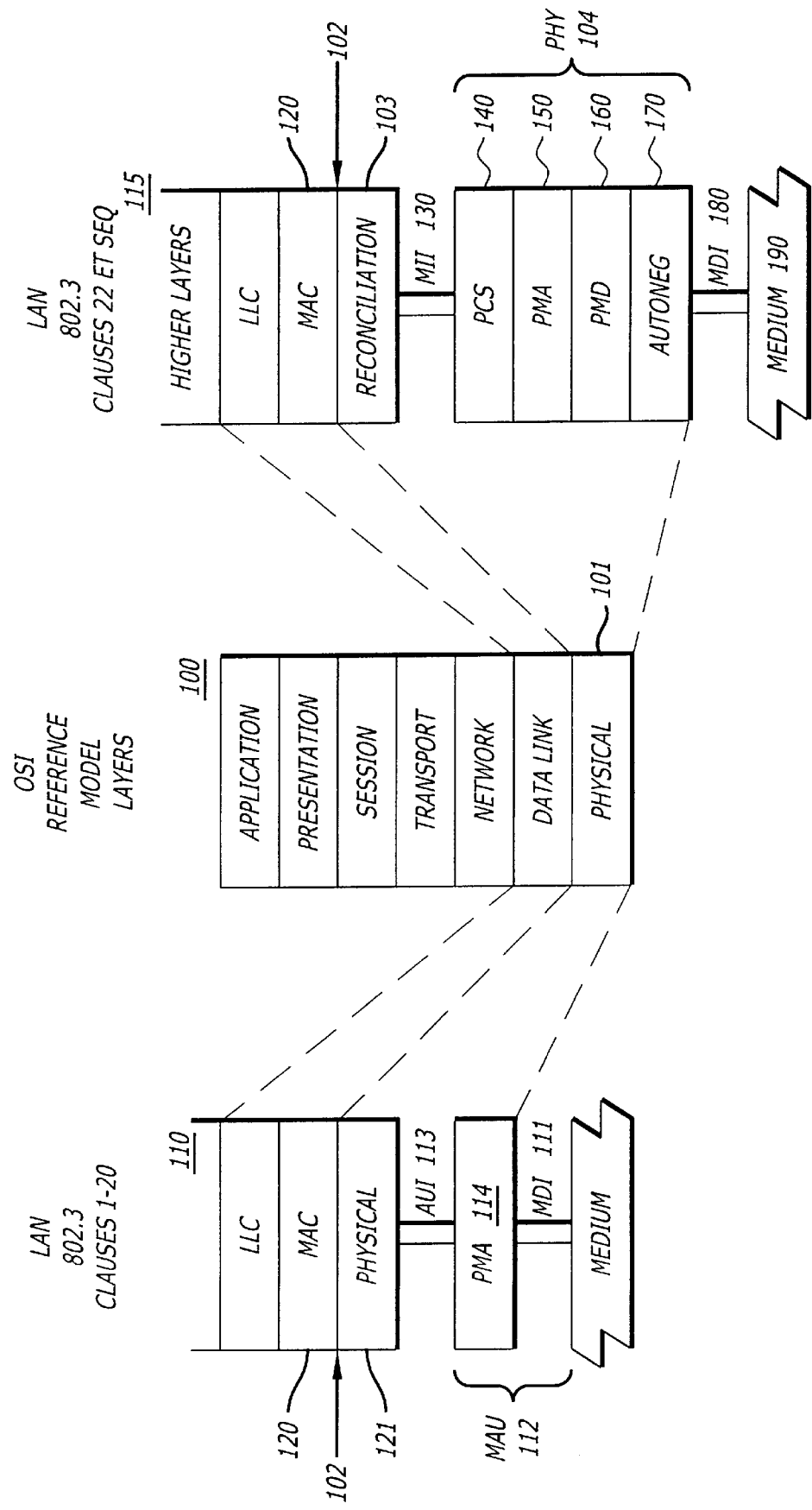
FIG. 1 illustrates a comparison of the OSI 7-layer abstract reference model to the IEEE 802.3 3-layer model and the IEEE 802.3 100BASE-T standard.
Figure 2:
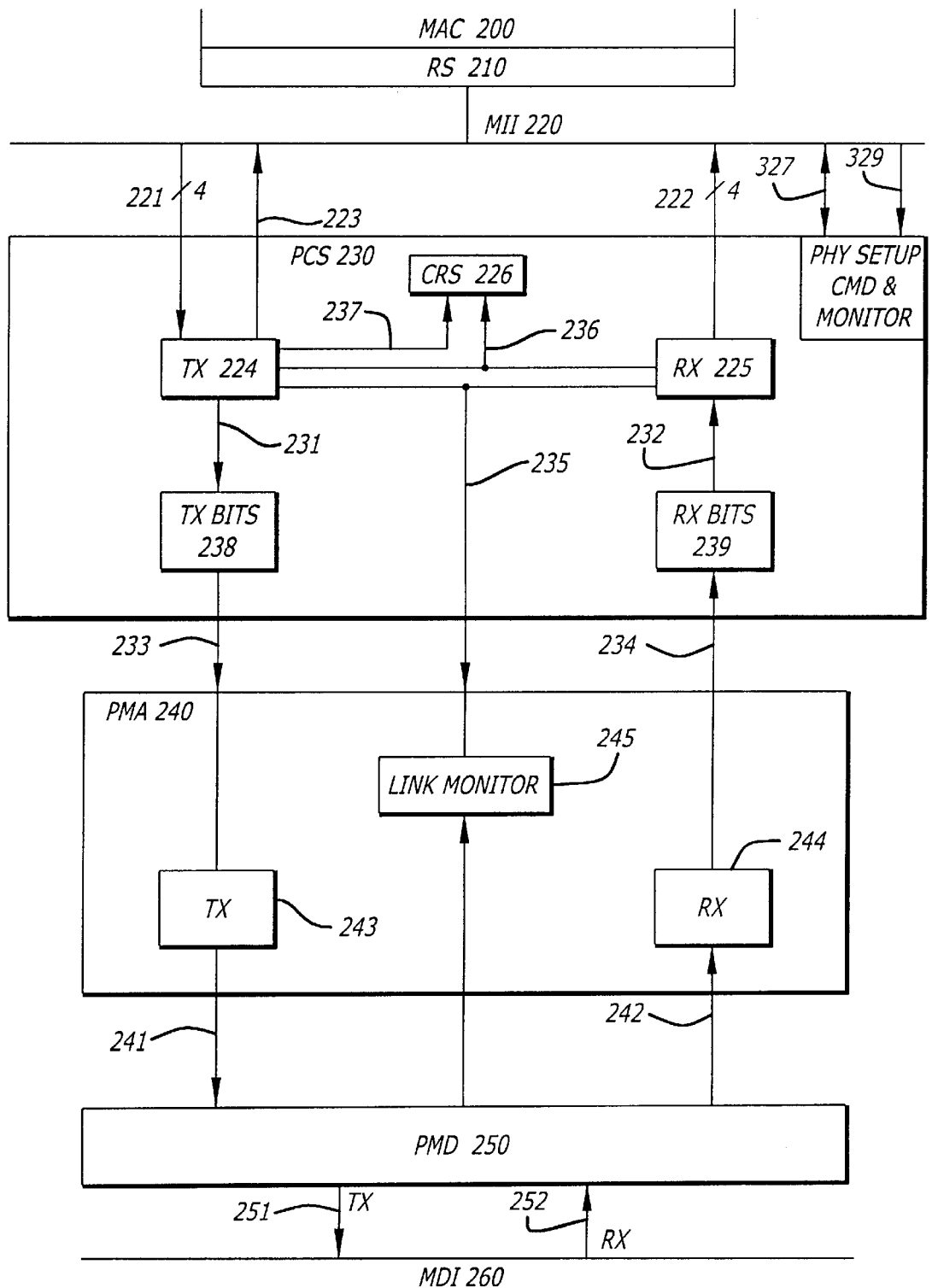
FIG. 2 illustrates the architectural model of the IEEE 802.3 100BASE-X standard.

Disclosed is a method and apparatus for transmitting information compatible with IEEE 802.3, 10BASE-T, 100BASE-TX, Auto-Negotiation, and Ethernet LAN standards across a service interface, located in the Physical Layer, that allows a minimization of the number of electrical connections required to implement a PHY device that supports a number of Ethernet LAN ports. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

An embodiment of the present invention is optimized for use in a dual speed (10 Mb/s and 100 Mb/s) PHY device with multiple (Quad or Hex) physical medium connections that communicate with a highly integrated MAC device controlling multiple (e.g., twelve or twenty four) Ethernet communication channels. An embodiment of the present invention may also be used in a single channel, dual speed PHY device, where minimization of pin count allows implementation with very small, low cost IC packaging.

Master System Synchronization Clock

According to an embodiment of the present invention, all timing information required in the PHY device can be derived from a single master clock input operating at a single rate. This single clock rate represents the periodic alignment of the data cells transmitted as a result of the data rates supported by the interface. As an example, a master clock operating at 5 MHz meets this criteria when transmitting information according to the 10BASE-T and 100BASE-TX standards.

During 100BASE-TX operation, transitions of physical medium signals occur at time increments of 8 ns. During 10BASE-T operation, transitions of physical medium signals occur at time increments of BT/2 or 50 ns. When comparing a stream of 50 ns data cells and 8 ns data cells, it can be seen that the edges line up every 200 ns. 8 ns divides evenly into 200 ns twenty five times and 50 ns divides into 200 ns four times. A repeating 200 ns event can be effectively signaled by a 5 MHz clock into the PHY device. It is well understood by those skilled in the art that all clocks required for internal operation of a PHY device can be synthesized from a 5 MHz Sync Clock Input Line.

However, it is understood that a time reference internal to the PHY device will be operating at a much higher frequency than that of the sync clock to achieve the necessary time resolution to perform the required functions. Jitter on the sync clock can cause jitter in the synchronization boundaries of the processes internal to the PHY device. Those skilled in the art realize that there are well known strategies for dealing with jitter on the synchronization reference (sync clock). However, it is good design to minimize jitter as this is the input clock reference for the entire PHY device. Since the PHY device comprises primarily analog functions, not only can a Phase Locked Loop be used to reduce jitter of the clock after sampling, well known analog circuitry can be used to treat the continuous signal of a digital clock as an analog waveform, measure a representation of the power level received, and determine an optimized sampling (or slicing) point. A side benefit of such an "Auto-Slice" algorithm is to allow the PHY device to make a determination of the type of digital logic used by the MAC device: 5 v, 3.3 v or 2.5 v, and set the initial operating characteristics of the other digital interface drivers and receivers, particularly the Status Management Line, appropriately. This is particularly important for plug-in modules containing a PHY device that interfaces with a digital MAC device of unknown logic type. It is also important in eliminating Hot Carrier effects in low voltage digital devices when interfaced to a PHY device operating at 5 v.

Status Management Line

The PHY device needs a communication mechanism by which the mode of operation, e.g., 10BASE-T, 100BASE-TX or diagnostic, mode, can be set. The PHY device also needs a communication mechanism by which various parameters of internal status can be monitored. There are several ways to achieve this objective using a single bi-directional line and a clock. One approach is to emulate the management communications concepts in the management port for the MII defined in Clause 22 of IEEE supplement 802.3u, but operate it at the 5 MHz system sync clock rate so that an additional clock line is not required.

Hardware Reset Line

It is useful to provide a single line whose purpose is to override and reset the device if the PHY device lost communication due to some unexpected, stable, failure mode.

Transmit Functions (100BASE-TX)

IEEE 802.3 Clause 26, 100BASE-FX uses the well known Non-Return to Zero Inverted (NRZI) coding format for physical medium signaling. This exact data format is used to transfer transmit information over-the service interface of the present invention when operating in 100BASE-TX mode. A 100 Mb/s data rate after 4B/5B encoding requires transmitting code_bits at a 125 MHz line rate. NRZI coding causes a signal transition for every ONE and no signal transition for every ZERO. The result creates data cells at 8 ns increments and can be directly converted (without reclocking if desired) to the MLT-3 format specified for 100BASE-TX physical medium signaling. An additional benefit is that the frequency spectrum peaks at 62.5 MHz and has zero theoretical energy at 125 MHz which aids implementation of physical circuits.

Transmit Functions (10BASE-T)

Figure 3C:
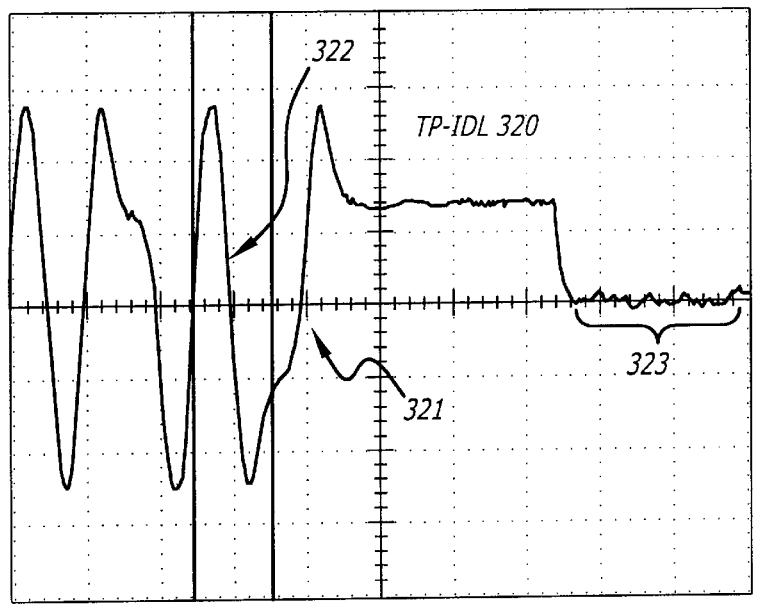
FIG. 3C illustrates the TP_IDL signal.
Figure 3C:
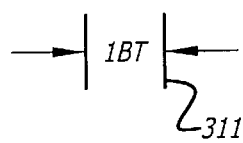

With reference to FIG. 3A, 10BASE-T operation employs a discontinuous signaling method over the transmission medium. When data is not being sent over the medium, the voltage on the medium is zero (e.g., at 301), with the exception of an occasional, 1 BT wide Link Test Pulse (e.g., at 300). As illustrated in FIG. 3B, data sequences of all ONES or all ZEROs have signal transitions at the bit cell boundary 311 as well as in the center of the cell 312. As a result, signal transitions may be expected to occur in increments of BT/2, that is, 50 ns. All ONEs or ZEROs result in a 10 MHz waveform, while a ONE, ZERO, ONE, ZERO sequence results in a 5 MHz waveform.

All allowable physical medium signals can be represented by large positive or negative signal transitions (to create waveforms) or small positive or negative signal transitions (to shape the waveforms to create pre-distortion). All major signal transitions must occur in time increments of BT/2 (50 ns) and waveform pre-distortion can be created through the use of small signal transitions on the same time boundaries.

Figure 5:
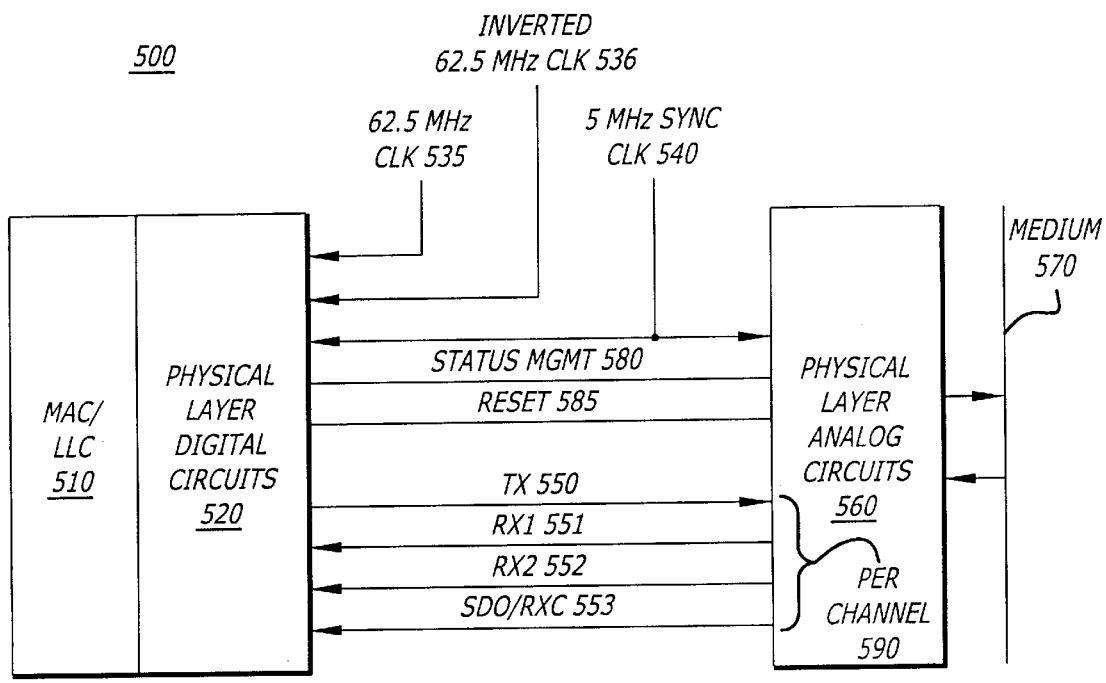
FIG. 5 illustrates a technology based implementation of a media access controller device as embodied by the present invention and conforming to the IEEE 802.3 100BASE-X standard.
Figure 4:
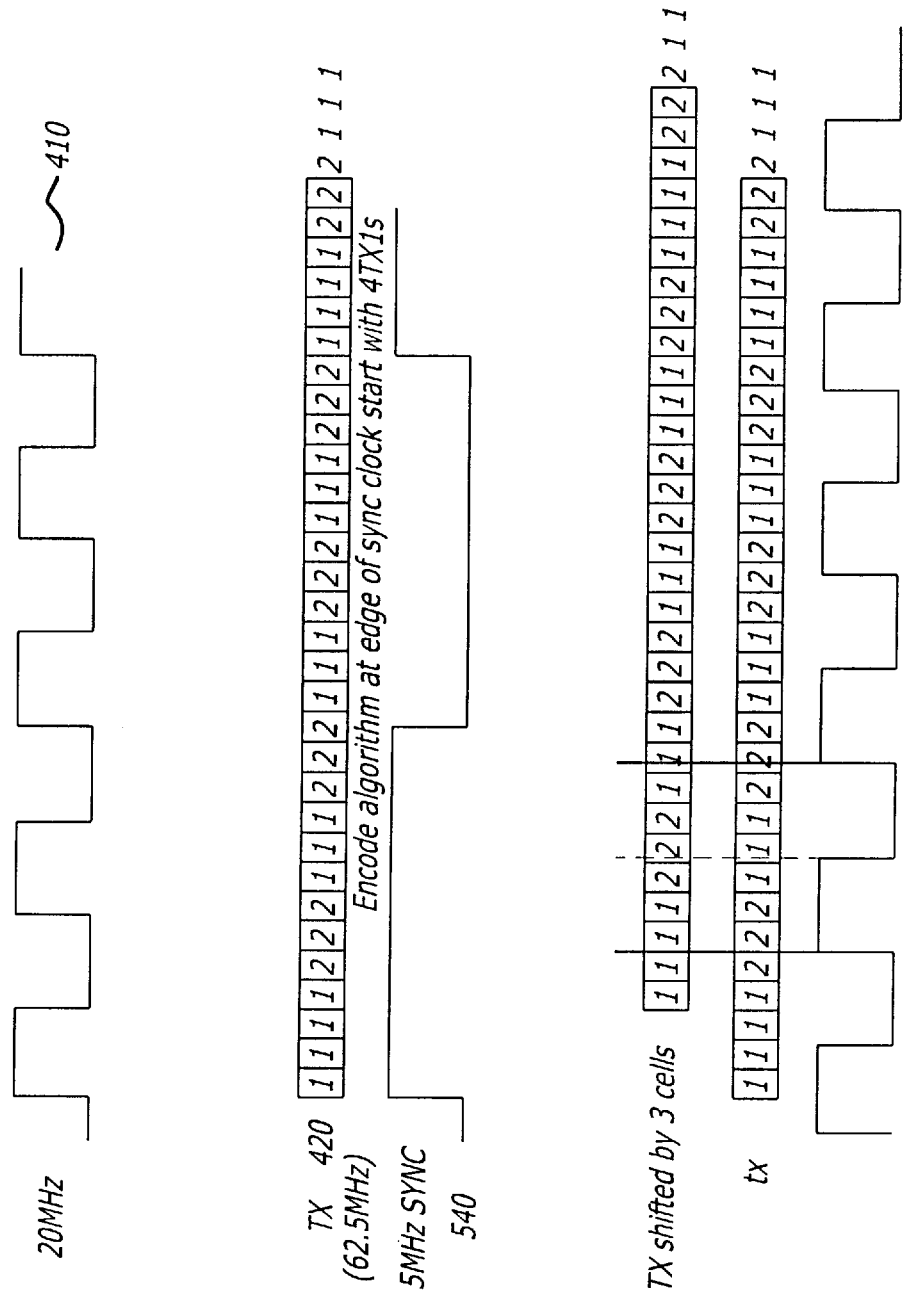
FIG. 4 illustrates the transmission of signals in accordance with the present invention.

Thus, in accordance with the present invention, 10BASE-T waveshape information is transmitted at a 20 MHz rate (1/50 ns) across a service interface using one 20 MHz clock and three data lines: positive voltage, negative voltage and voltage level line. The voltage level line (full or reduced) is used to create pre-distortion in the 5 MHz waveforms. However, as illustrated in FIGS. 4 and 5, embodiment requires a single transmit data line 550 operating with 8 ns data cells (62.5 MHz) for compatibility with 100 Mb/s NRZI data transmission. The folding edge of the clock samples the previous data cell, which provides look ahead information. Thus, if the 10BASE-T shape being sampled matches the previous shape, pre-distortion is applied, by cropping the level by approximately 80%, thereby saving a line and a pin for the device.

10 MHz data rates or 20 MHz waveshape transition rates (410) do not divide evenly into a single 62.5 MHz data stream (420). Nevertheless, the present invention does not require the digital side (520) of the service interface 500 to implement phase locked loops (or any other analog functionality).

The algorithm below converts a three data line service interface operating at 20 MHz into a single line operating at 62.5 MHz. The digital ASIC on the digital side 520 of the service interface has a 62.5 MHz clock 535 as well as a 5 MHz sync clock 540. Note that in a three line interface, four 50 ns data cells are transmitted for every 200 ns periods of the sync clock. With reference to TX420 in FIG. 4, as a first step, on the rising edge of sync, transmit four 62.5 MHz clock cycles of first 50 ns TX+ data cell. At step two, transmit three 62.5 MHz clock cycles of the first 50 ns TX– data cell. Follow with the third step, in which service interface transmits three 62.5 MHz clock cycles of the second 50 ns TX+ data cell. An additional three 62.5 MHz clock cycles of the second 50 ns TX– data cell are next transmitted as step four At step five, transmit three 62.5 MHz clock cycles of the third 50 ns TX+ data cell. At step six, transmit three 62.5 MHz clock cycles of the third 50 ns TX– data cell. Then transmit three 62.5 MHz clock cycles of the fourth 50 ns TX+ data cell at step seven. At step eight the service interface transmits three 62.5 MHz clock cycles of the fourth 50 ns TX– data cell. Finally, at step nine, on the rising edge of sync, transmit four 62.5 MHz clock cycles of fifth 50 ns TX+ data cell, and so on, repeating the 200 ns cycle of the 5 MHz sync clock.

Thus the serial information stream has been purposely jittered in a controlled manner to allow data transmission across a service interface from a circuit not containing phase locked loops at a data rate that does not match the internal clock domains of the source of transmission.

The implementation of the PHY device contains phase locked loops and other forms of clock synthesis circuitry. A 20 MHz clock is generated, internal to the PHY device, with a positive going edge that matches the positive going edge of the sync clock. A 62.5 MHz clock is also generated, internal to the PHY device, with a positive going edge that matches the positive going edge of the sync clock. A new 20 MHz line transmit sample clock is generated by shifting the sync clock edge synchronous 20 MHz clock by five 62.5 MHz clock cycles (40 ns).

If the 62.5 MHz transmit line is received by the PHY device and treated as TX–, then delayed by three 62.5 MHz clock cycles (24 ns) to form another data stream treated as TX+, it can be seen that the rising edge of the 20 MHz line transmit sample clock always samples both jittered data streams near the center of the data cell and regenerates the original 20 MHz waveshape information, with exception of pre-distortion. The impact of jitter is irrelevant.

With respect to pre-distortion, the voltage level is reduced to pre-distort only the 5 MHz waveforms. Thus, the first 50 ns of the wave is at full level and the second 50 ns of the wave is reduced for pre-distortion, only when the waveshape stays constant for 100 ns. In so doing, an additional line is unnecessary to convey this information. It can be seen that if the 62.5 MHz transmit line is received by the PHY device and treated as TX+ (instead of TX– as before) and the stream delayed by three 62.5 MHz clock cycles (24 ns) is treated as TX− (instead of TX+ as before), the previous falling edge of the 20 MHz line transmit sample clock samples the previous 50 ns cell of waveshape information. If the waveshape of the previous 50 ns cell sampled matches the current 50 ns cell sampled, pre-distortion is applied and the voltage level of the line is reduced.

Once the PHY device has reconstructed the 10BASE-T waveshape information clocked at 20 MHz, the information is used to trigger analog current switches which drive filters and amplifiers to create 10BASE-T waveforms on the physical medium.

Receive Functions (100BASE-TX)

The receive functionality of the service interface requires three lines which change in function depending upon whether the PHY device is in 10BASE-T mode or 100BASE-TX mode. In 100BASE-TX mode, the three lines are:

1. RX1=NRZI Receive DataLine 551
2. RX2=Complement of NRZI Data Line 552
3. SDO/RXC Line 553

The NRZI Receive Data line 551 is the same as the NRZI data line used in the well known FDDI standard for connection to an optical receiver.

The Complement line 552 causes a signal transition for every ZERO received and no signal transition for every ONE received as opposed to the NRZI coding of a signal transition for every one received and no signal transition for every ZERO received. The combination of these two lines allows self clocking of data (because there will be a transition on one of the two lines every 8 ns) directly into a digital ASIC.

The SDO/RXC line 553, in 100 mb/s mode, responds to adequate power levels in the physical medium signals and generally corresponds to the variable Signal_Detect defined in the FDDI specification ANSI TP-PMD, Rev. 2.2 clause 10.1.1. In TP-PMD, the assertion time of Signal Detect (to valid power level) is 0 μs to 1000 μs. In 100BASE-TX, the information from Signal_Detect it passed up to the MII through the Link Monitor Process as defined in IEEE supplement 802.3u Clause 24.3.4.4. The Link Monitor Process adds a hystersis of between 330 μsits to 1000 μs to the assertion of valid link to the MII. This sets a maximum assertion time, for qualification of a valid link, from physical medium signals to MII of 2000 μs.

The maximum valid frame size in 10BASE-T is 1514 bytes. Adding a preamble and Start of Frame Delimiter (8 bytes) as well as the TP_IDL waveform (4.5BT), the resulting maximum length physical medium signal possible in 10BASE-T is less than 1220 μs. Thus, if the assertion time of the SDO/RXC line, in 100 mb/s mode, is specified between 1220 μs and 2000 μs, the link detection dynamics not only meet the standards criteria set for physical medium to MII signaling, but do not respond to maximum 10BASE-T packets if the PHY device is set for 100BASE-TX, notwithstanding that the line operation is actually 10BASE-T.

Receive Functions (10BASE-T)

In 100BASE-TX mode, the three lines are:

1. RX1 551=RX+
2. RX2 552=RX−
3. SDO/RXC 553

The idle signal in 10BASE-T represents a quiet line where allowable noise events are required to be less than ±50 mv after filtering. The operation of the implementation is as follows. RX+ is the asynchronous output of a comparator which asserts when the input level exceeds a positive level greater than ±50 mv after filtering. RX− is the asynchronous output of a comparator which asserts when the input level exceeds a negative level more negative than −50 mv after filtering. In 10BASE-T mode, SDO/RXC acts very much like the receive clock in the well known National Semiconductor seven-wire interface except that it operates at 20 MHz instead of 10 MHz as found in the classic implementation. The receive clock is discontinuous in nature (to match the data) and not only provides clock information to be used by the digital ASIC to sample the RX+ and RX− lines, but the envelope of clock provided by SDO/RXC follows the 10BASE-T definition of Carrier Sense. If the input waveforms do not meet the acceptance criteria of a 10BASE-T MAU, SDO/RDX remains at, or returns to, zero. Unacceptable waveforms received cause activity on RX+ and RX−, but the mechanism to clock valid data into the digital ASIC is turned off and a loss of clock envelope indicates the receipt of signals that are not valid 10BASE-T.

In one embodiment, the default mode setting is 10 Mb/s at start-up or after reset. Link Test Pulses, or Auto-Negotiation bursts, cause RX1 to assert for a nominal 100 ns, which is not a valid 10BASE-T data waveform, so SDO/RXC does not assert.

What is claimed is:

1. Coupled to a physical layer device having a digital medium access control (MAC) device and an analog physical layer device, the analog physical layer device to be coupled to a communication medium, a physical layer device service interface comprising:
   a synchronous clock line to provide a clock signal;
   a status line to monitor a status of the physical layer device service interface;
   a reset line to provide reset if the status line is unable to monitor the status of the physical layer device service interface; and
   a data transmission channel comprising:
      a transmit data channel including a transmit data line to transmit data to the analog physical layer device, and
      a receive data channel including a plurality of receive data lines to receive data at the digital MAC device.

2. The physical layer device service interface of claim 1, wherein the synchronous clock line operates at a constant clock rate independent of a transmission rate of the communication medium.

3. The physical layer device service interface of claim 1, wherein the transmit data channel transmits data at a constant rate independent of a transmission rate of the communication medium.

4. The physical layer device service interface of claim 1, further comprising a signal detect line that detects a transmission speed of the communication medium.

5. The physical layer device service interface of claim 4, wherein the signal detect line detects the transmission speed of the communication medium by measuring the power levels.

6. The physical layer device service interface of claim 5, wherein the transmission speed detected by the signal detect line is either 10 or 100 million bits per second.

7. A physical layer device service interface placed between a digital media access controller and an analog physical layer device, the physical layer device service interface comprising:
   a status line;
   a reset line to provide a reset if the status line is unable to support monitoring of an internal status of the physical layer device service interface; and a data transmission channel including:
  a transmit data channel to transmit data to the analog physical layer device, and
  a receive data channel to receive data at the digital medium access controller.

8. The physical layer device service interface of claim 7, further comprising:
  a synchronous clock line to provide a clock signal.

9. The physical layer device service interface of claim 7, wherein the analog physical layer device is coupled to a communication medium.

10. The physical layer device service interface of claim 9, wherein the transmit data channel transmits data at a constant rate independent of a transmission rate of the communication medium.

11. The physical layer device service interface of claim 9, wherein the receive data channel of the data transmission channel includes at least two receive data lines.

12. The physical layer device service interface of claim 9, further comprising a synchronous clock line that operates at a constant clock rate independent of the transmission rate of the communication medium.

13. The physical layer device service interface of claim 9, further comprising a signal detect line that detects a transmission speed of the communication medium.

14. The physical layer device service interface of claim 13, wherein the signal detect line detects the transmission speed of the communication medium by measuring power levels.

15. The physical layer device service interface of claim 7, wherein the transmit data channel of the data transmission channel includes a transmit data line.

16. An apparatus comprising:
  an analog physical layer device;
  a digital media access control (MAC) device; and
  an interface between the MAC device and the analog physical layer device, the interface including:
    a status line,
    a reset line to provide a reset if the status line is unable to support monitoring of an internal status of the interface, and
    a data transmission channel including (i) a transmit data channel to transmit data to the analog physical layer device and (ii) a receive data channel to receive data at the digital medium access controller.

17. The apparatus of claim 16, wherein the interface further including a synchronous clock line to provide a clock signal to the analog physical layer device and the digital MAC device.

18. The apparatus of claim 16, wherein the analog physical layer device is coupled to a communication medium.

19. The apparatus of claim 18, wherein the transmit data channel transmits data at a constant rate independent of a transmission rate of the communication medium.

20. The apparatus of claim 18, wherein the synchronous clock line operates at a constant clock rate independent of a transmission rate of the communication medium.

21. The apparatus of claim 18, wherein the interface further comprises a signal detect line that detects the transmission speed of the communication medium.

22. The apparatus of claim 21, wherein the signal detect line of the interface detects the transmission speed of the communication medium by measuring power levels.

23. The apparatus of claim 16, wherein the transmit data channel of the interface includes a transmit data line.

24. The apparatus of claim 16, wherein the receive data channel of the interface includes at least two receive data lines.

25. The apparatus of claim 16 is a switching system product.

26. The apparatus of claim 16 is a transmission system product.

27. Supporting communications between a digital media access control (MAC) device and an analog physical layer device, a physical layer device service interface comprising:
  means for monitoring status of the physical layer device service interface;
  means for resetting the analog physical layer device if the means for monitoring is unable to monitor the status of the physical layer device service interface;
  means for transmitting data to the analog physical layer device; and
  means for receiving data by the digital MAC device.

* * * * *